April 17, 1956     P. H. BILLS ET AL     2,742,188
LIQUID MEASURING AND DISPENSING APPARATUS
Filed April 30, 1953     3 Sheets-Sheet 3

INVENTORS,
Philip H. Bills and
Alfred L. Grisé,
BY Chapin † Neal.
Attorneys.

United States Patent Office 2,742,188
Patented Apr. 17, 1956

2,742,188

LIQUID MEASURING AND DISPENSING APPARATUS

Philip H. Bills, Longmeadow, and Alfred L. Grisé, Springfield, Mass., assignors to Gilbert & Barker Manufacturing Company, West Springfield, Mass., a corporation of Massachusetts Application April 30, 1953, Serial No. 352,262

20 Claims. (Cl. 222—72)

This invention relates to improved apparatus for pumping and measuring liquids.

The invention, while capable of general application, finds one advantageous use in apparatus, such as is used at service stations, for dispensing measured quantities of liquid fuel to the fuel tanks of automotive vehicles.

The invention has for its general object the provision of a simplified and improved apparatus for dispensing measured quantities of air-free liquid.

More particularly, the invention has for an object, the provision of a metering pump, which is adapted for interposition in a flow line or conduit and for driving suitable registering mechanism, together with a priming pump having its inlet connected to the inlet chamber of the metering pump, and driving means for the metering pump, including a variable-speed transmission, which is controlled by the pressure of the fluids, gaseous or liquid, that are discharged by the priming pump and which is inoperable to drive the metering pump, when the priming pump is discharging air or gases only, and is operable to drive the metering pump when the priming pump is discharging liquid and at speeds varying with the pressure of the liquid discharged.

The invention also has for another object, the provision in a metering pump of the type described, which is adapted for use in apparatus, such as is used at service stations for dispensing liquid fuel to the fuel supply tanks of automotive vehicles and is controlled as above described, of a second control for the variable-speed transmission responsive to the pressure of liquid in the delivery conduit and operable to reduce the speed of the metering pump, as the flow through such conduit is throttled by partial closure of the hose-nozzle valve, and to stop such pump, when the flow ceases on full closure of the nozzle valve.

The invention has for another object, the provision in an apparatus of the class described, of improved control means for the speed-changing mechanism, comprising a chamber having a movable wall connected to the speed-changing element of the transmission and having on one side of said movable wall an inlet, connected to the outlet of the priming pump, and an outlet of restricted area capable of passing air and gases at the maximum rate at which they can be pumped but incapable of passing liquid at such rate, whereby on the discharge of liquid, pressure will build up in the chamber and move the movable wall, actuating the speed-changing element of the transmission to drive the metering pump and at speeds which vary with the pressure of the liquid discharged.

These and other objects will best be understood from the following description of one illustrative embodiment of the invention in the accompanying drawings, in which:

Fig. 6 is a sectional plan view taken on the line 6—6 of Fig. 2 and showing the variable speed drive for the metering pump;

Fig. 7 is a fragmentary cross sectional view taken on the line 7—7 of Fig. 2; and Fig. 8 is a fragmentary cross sectional view taken on the line 8—8 of Fig. 2.

Figure 1:
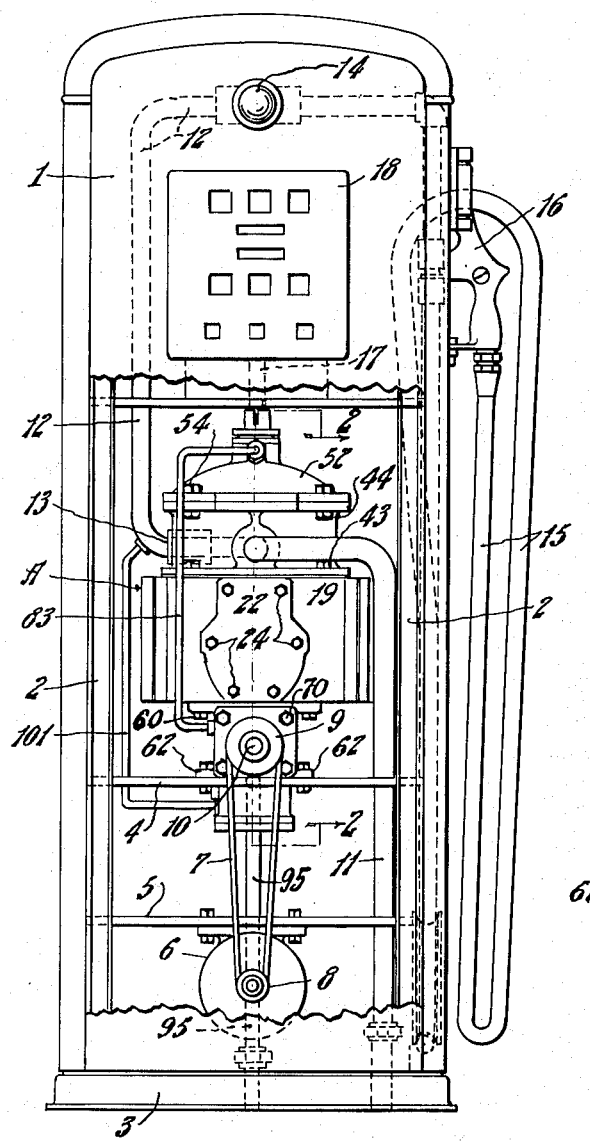
Fig. 1 is a small-scale front-elevational view of a gasoline measuring and dispensing apparatus embodying the invention, the housing of the apparatus being broken open to show the interior thereof and particularly the unit apparatus of this invention.

Referring to these drawings, Fig. 1 shows the relationship of the apparatus of this invention to a measuring and dispensing apparatus, such as is commonly used at service stations for dispensing gasoline or other motor fuels to auomotive vehicles. The dispensing apparatus includes a suitable housing 1, which has been partly broken away to reveal the apparatus of this invention. Inside the housing is a suitable supporting frame, usually including a plurality of corner posts or columns 2 upstanding from a base 3. The apparatus of this invention includes, as one unit within a casing A, a metering pump, of the positively-acting displacement type, scavenging means for air and gases consisting of a positively-acting priming pump, and driving means for both pumps and including a variable-speed transmission in the drive for the metering pump. This casing A is suitably supported on a shelf 4, secured as indicated to the columns 2. Below this shelf is a similar shelf 5, similarly secured to the columns and supporting an electric motor 6, which drives by a belt 7 and pulleys 8 and 9 the driving shaft 10 of the unit apparatus A. The metering pump normally draws gasoline through a suction pipe, shown in part at 11, from a low-level supply tank (not shown), and delivers it free of air into, and forces it outwardly through, a discharge pipe 12. The latter usually has interposed therein a check valve 13 and a flow indicator 14, and terminates with a flexible hose 15, having on its delivery end the usual valve-controlled nozzle 16. The metering pump drives through a shaft 17 a register 18, which may be of usual well known form and which shows the quantity and/or cost of the gasoline dispensed.

Figure 2:
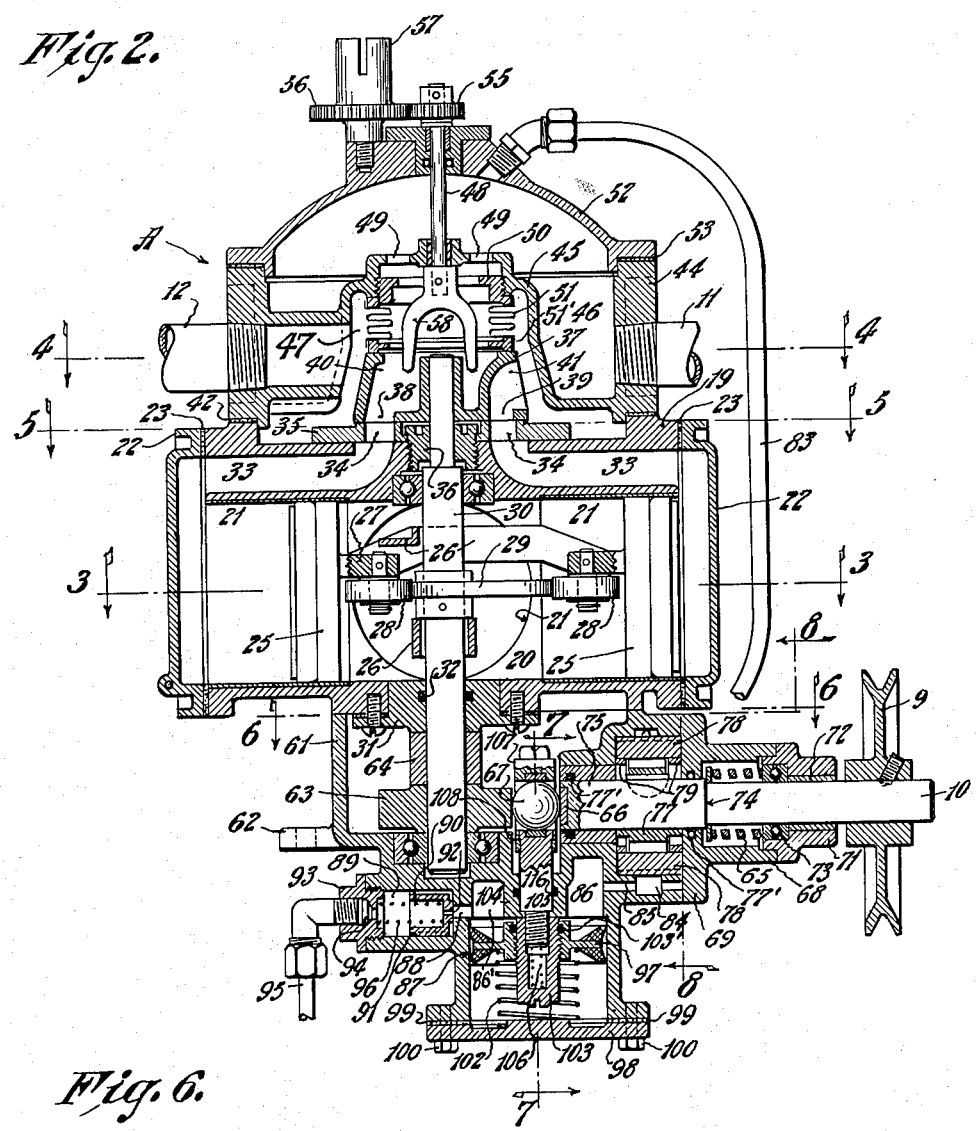
Fig. 2 is a sectional elevational view, taken on the line 2—2 of Fig. 1 but drawn to a larger scale and showing the unit apparatus of this invention.
Figure 3:
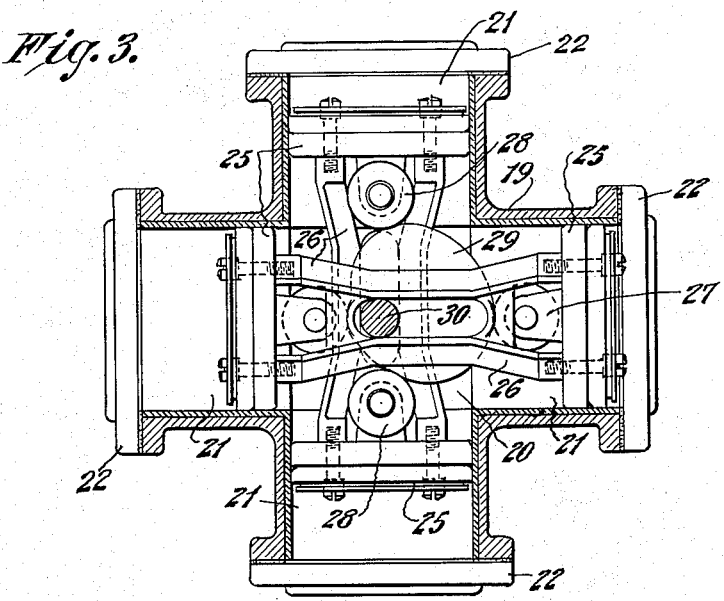
Fig. 3 is a sectional plan view, taken on the line 3—3 of Fig. 2, of the metering pump portion of the apparatus.

The metering pump is of known form and will be briefly described with reference to Figs. 2 and 3. This pump is contained in a section 19 of the casing A. This pump has a central cylindrical chamber 20 and a plurality (four as shown) of horizontally-disposed cylinders 21 radiating from the central chamber and disposed in opposed pairs. The outer end of each cylinder is closed by a head 22, clamped with an interposed gasket 23 to the end of the cylinder by suitable screws such as are indicated at 24 in Fig. 1. Each cylinder contains a suitable piston 25, having a suitable leak-proof sliding engagement with the peripheral wall of its cylinder. The pistons of each pair are rigidly interconnected by a member 26. The two members 26 cross each other at different levels in non-interfering relation and have longitudinal slots. The inner wall of each piston has an inwardly projecting lug 27 which supports a roll 28, riding on the periphery of a cam 29. The latter is fixed to a central shaft 30, which extends vertically through the central chamber 20 and the longitudinal slots in members 26 and is rotatably supported in suitable bearings, as indicated. The lower end of this shaft (Fig. 2) extends through a cover 31 and below the latter for connection to a variable-speed driving means to be later described. The cover 31 has an O-ring packing 32 which encompasses the shaft 30 and prevents leakage from the chamber of the neutral liquid contained therein.

Figure 4:
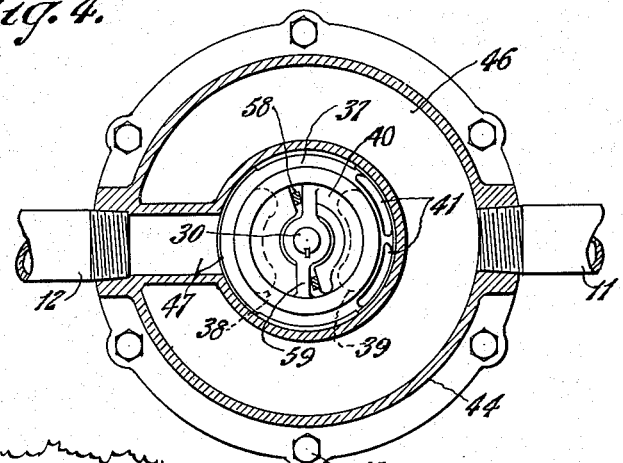
Fig. 4 is a sectional plan view taken on the line 4—4 of Fig. 2 and showing the valve for the metering pump.
Figure 5:
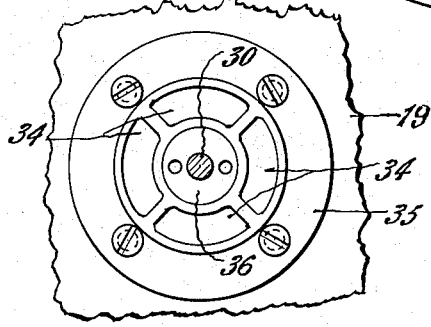
Fig. 5 is a sectional plan view taken on the line 5—5 of Fig. 2 showing the valve-controlled ports of the metering pump.

The casing 19 (Fig. 2) has passages 33 therein, one for each cylinder 21. Each passage connects the outer end of a cylinder 21 to a port 34, formed in a valve seat plate 35 (see also Fig. 5), centrally fixed, as by the nut 36, to the top of the casing 19. Liquid is distributed to or from the ports 34 and passages 33 by a rotary valve 37 (see also Fig. 4) which rests upon the upper face of plate 35. This valve has in its base an inlet port 38 and an outlet port 39. The inlet port 38 communicates with the hollow interior 40 of the valve while the outlet port communicates with the space outside the valve by means of two passages 41. The valve 37 is slidably keyed to the upper end of shaft 30. A casing 44 is clamped to the top of casing section 19 with an interposed gasket 42 by cap screws 43. The hollow interior of casing 44 is divided by a partition 45 into inlet and outlet chambers 46 and 47, respectively. The chambers 46 and 47 are adapted to be respectively connected to suction pipe 11 and discharge pipe 12. The partition 45 has a central bearing for a shaft 48 and around this bearing, a circular series of holes 49. A bushing 50, threaded into the partition, has fixed thereto the upper end of a bellows 51, the lower end of which is fixed to a seal ring 51′ which bears on the upper end of valve 37. Thus, the inlet passage 40 of the valve connects through the interior of bellows 51, the interior of bushing 50 and the holes 49 with the inlet chamber 46 at a location above the bottom thereof and above the upper end of the suction pipe 11. The discharge passages 41 of the valve open into the outlet chamber 47. A cover 52 is clamped with an interposed gasket 53 to casing 44 by bolts 54. This cover has an upper bearing for shaft 48, which has fixed to its upper end a pinion 55, meshing with a gear 56, rotatably supported on the cover and carrying a coupling 57 for connection with the shaft 17 that drives register 18. The lower end of shaft 48 has fixed thereto a fork 58 which is driven by valve 37 by means of the spider arm 59 (Fig. 4).

The variable speed transmission for driving the metering pump will next be described. This transmission is contained in casing 61, which is fixed to the bottom face of casing 19 by cap screws 60. Casing 61 carries the lugs, such as 62, that rest upon and are bolted to the supporting shelf 4 of the frame of the dispensing apparatus as shown in Fig. 1. The described shaft 30 of the metering pump (Fig. 2) passes into the interior of this casing 61, has fixed to it a driven disk 63, and has its lower end journaled in a bearing in the lower wall of the casing. Between the driving disk 63 and the cover 31 is a spacing sleeve 64. The described driving shaft 10 is rotatably mounted in this casing 61 with its axis disposed at right angles to that of shaft 30. The shaft 10 is also axially movable, being thrust axially inward by a spring 65. Shaft 10 has in its inner end an insert 66 of hardened steel which is thrust by spring 65 against a ball 67, also of hardened steel, that bears against the periphery of the hardened steel disk 63 on shaft 30. The ball 67 is movable vertically, by means to be described, from the neutral position illustrated, in which the center of the ball lies in an extension of the axis of shaft 10, downwardly to various other positions to vary the speed of disk 63, and thus shaft 30. The spring 65 is located in the interior of a hollow hub 68 which projects outwardly from a cover plate 69, secured by cap screws 70 to an end face of casing 61. The outer end of hub 68 is closed by a cap 71 which has a sleeve bearing 72, supporting one end of shaft 10 and containing a ball thrust bearing 73. The spring 65 acts between thrust-bearing 73 and a washer which abuts shoulder 74 on shaft 10 to thrust the latter axially inward as described and press ball 67 against the driving disk 63. The shaft 10 has a sleeve bearing 75 in casing 61 for supporting its inner end.

The priming pump will next be described with reference to Figs. 2 and 8. This pump is mounted in the casing 61, which has a cylindrical pump chamber 76, which surrounds a portion of shaft 10 and is disposed eccentrically thereof. The outer end of chamber 76 is closed by the described cover 69. The priming pump is driven by shaft 10, the cylindrical rotor 77 of the pump being located in this chamber and slidably keyed to shaft 10. Leakage from the pump chamber 76 along shaft 10 is prevented by O-rings 77′ mounted one in bearing 75 and the other in cover 69. Rotor 77 has a circular series of radially-slidable vanes 78. These are held with their outer edges in sliding engagement with the peripheral wall of chamber 76 by means of two annular rings 79, which are located one in each of two circular recesses 80 in the ends of the rotor 77 and support the blades 78 near their outer ends. The end faces of each blade slidably engage one with the inner end wall of pump chamber 76 and the other with the inner face of cover 69. The inlet port 81 of the pump chamber is connected to a passage 82, which is connected by a tube 83 to cover 52 and communicates with inlet chamber 46 at a location very near to the upper end thereof. The outlet port 84 of the pump chamber communicates with an outlet passage 85 from which the fluids (air, gas or liquid) are returned to the storage tank through a suitable conduit in which is interposed the control means for the variable-speed transmission described.

This transmission control means (Figs. 2 and 7) includes a chamber, in this case a cylinder 87, which is formed in a downward extension of the bottom wall of casing 61, and the upper end of which communicates with a space 86 (Fig. 2) connected to the described outlet passage 85. The cylinder 87 also communicates with a space 86′ which has an outlet passage 88 opening into a chamber 89. The latter is formed in casing 61 and contains a sleeve 90, slidably supported by longitudinally-extending radial vanes 91 on its exterior. The inner end of sleeve 90 is closed except for a small orifice 92, which constantly communicates with passage 88. The outer end of chamber 89 is closed by a cover 93 except for a passage 94, which is adapted to be connected by means of a conduit 95 with the air space of the oil storage tank. A spring 96, acting between cover 93 and the end wall of sleeve 90, normally holds the latter against the inner wall of chamber 89. Thus, the effective outlet from chamber 86′ is the orifice 92 which is of restricted area, in this example .113 inch. It opens only when necessary to relieve a condition later to be described.

The chamber or cylinder 87 contains a suitable movable wall, in this case a piston 97. The lower end of this cylinder is closed by a head 98, clamped with an interposed gasket 99 to the end of the cylinder by cap screws 100. The lower end of cylinder 87 (Fig. 7) is connected to one end of a tube 101 the other end of which is connected to the discharge pipe 12 (Fig. 1) at a location on the downstream side of check valve 13. The piston 97 is urged upwardly by a spring 102, acting between its lower face and the head 98. Threaded in the piston 97 is a hollow stop member 103, the lower end face of which is adapted to abut head 98 to limit the lower travel of the piston and the upper end face of which is adapted to engage the lower end face of a partition 104 to limit the upward travel of the piston. The spring 102 is just strong enough to lift the piston 97 to its upper position when there is no pressure of liquid on its upper face. The lower end of member 103 has suitable means, such as a screw-driver slot, by means of which it may be turned when head 98 is removed. Leakage between this stop member and piston 97 is prevented by an O-ring 103′. This stop member 103 receives the lower threaded end of a piston rod 105, which has fixed to its upper end the carrier or cage for the described ball 67. A spring 106, located within the hollow stop member, acts between the lower closed end of the latter and the bottom of rod 105 to create a pressure against the latter, tending to prevent relative turning movement of these adjustably connected parts and maintain them in the positions, to which they have been adjusted.

The carrier for ball 67 consists of upper and lower cross bars 107 and 108 (Fig. 7), which are clamped together in spaced parallel relation by two bolts 109, having cylindrical heads 110 and nuts 111. Oppositely-turned flanges 112 on the ends of bars 107 and 108 abut and space the central portions of these members properly to engage ball 67. The lower cross bar has a central opening in which the flanged upper end of piston rod 105 is received. Inserts 113 of hardened steel are provided in the central portion of the upper cross bar and in the head of piston rod 105 for engagement with the top and bottom of ball 67. The bolts 109 carry rolls 114 of hardened steel to engage the ball at opposite locations, these rolls being supported from the bolts by needle bearings 115. The cylindrical heads 110 are slidably received in sockets which are formed in the partition 104, one on each side of rod 105, and maintain the ball carrier properly positioned. An O-ring packing 116 in casing 61 encompasses piston rod 105 to prevent leakage from chambers 86 and 86' and the upper part of cylinder 87.

The apparatus must be initially primed after installation. This is accomplished by starting the electric motor 6 in the usual way and operating the apparatus until an uninterrupted stream of clear liquid is discharged from nozzle 16, after which the valve in the nozzle will be closed, the motor 6 will be stopped and the registering means 18 will be set back to zero. In the initial part of the priming operation, only the priming pump will operate and this will first draw air from inlet chamber 46 and suction pipe 11, such air being discharged through the space 86, cylinder 87, space 86', outlet 88 and restricted orifice 92 into the chamber 89 and from the latter through outlet 94 and tube 95, back into the air space of the storage tank. As the priming pump continues to operate, liquid will be drawn up in the suction pipe 11 and into inlet chamber 46 and, when the latter fills sufficiently, liquid will flow into the inlet passage 40 of the distributing valve 37 and pass out through its port 38 into one or more of the ports 34 and passages 33, thence into one or more cylinders 21, displacing air outwardly and upwardly therefrom into chamber 46 to be eliminated by the priming pump. Operation of the latter cannot cause movement of the pistons 25 of the metering pump because these will be held stationary by the braking pressure of the ball 67 on the disk 63 on shaft 30. Eventually, the priming pump will discharge liquid through its outlet 85 and into the control cylinder 87 and thence through the restricted orifice 92. This will create a back pressure, which acts on the piston 97, moving it downwardly and shifting ball 67 to start the metering pump in operation. The metering pump will first scavenge the air from its cylinders 21, forcing it out through the delivery conduit 12, hose 15 and nozzle 16. For a time, the discharge will have some air mixed with the liquid. Liquid will also be forced down tube 101 into the lower end of cylinder 87, displacing the air therefrom and forcing it up through tube 101 into the delivery conduit 12. Eventually, the latter conduit will discharge clear liquid and the apparatus then will be fully primed. The valve in nozzle 16 will be then closed and the motor 6 stopped.

In normal operation, the apparatus, when at rest, will be completely filled with liquid. The liquid on the upper part of cylinder 87 will be under atmospheric pressure, since it is connected by tube 95 with the air space of the storage tank. The liquid in the lower part of the cylinder 87 will be under the pressure that existed in the delivery conduit 12, at the time when the hose nozzle valve was closed, provided there has been no leakage. Thus, the piston 97 will be in its uppermost position, in which the speed-changing element of the transmission is in neutral position. Consequently, the metering pump will not immediately be driven. It should be noted that the spring 102 also would hold the piston 97 in its uppermost position, even though the pressure in the delivery conduit 12 should have been dissipated because of leakage, which of course would be an abnormal condition. With the apparatus fully primed, the priming pump will almost instantaneously build up pressure in the upper part of cylinder 87 but this will not cause movement of the metering pump, if the valve in hose nozzle 16 is closed, provided that the pressure, prevailing in the lower part of cylinder 87 is that which existed in the delivery conduit 12 at the time when the valve in nozzle 16 was closed. If such pressure is not available, then the metering pump will be momentarily operated to create enough pressure in the lower part of cylinder 87 and move the speed-changing element of the transmission to neutral position. Thus, ordinarily, until the valve in nozzle 16 is opened, only the priming pump will operate and this will circulate liquid at a relatively slow rate to and from the storage tank. For example, the priming pump in the present example, has a capacity of 1¾ gallons per minute as against the usual rotary pump, presently used in gasoline dispensing apparatus, which has a maximum capacity of 20 gallons per minute and which under conditions similar to those described, would be pumping liquid at about this rate through a by-pass against the pressure of the closure spring of a by-pass valve which pressure would be at least 20 p. s. i. The present priming pump does much less work, when the dispensing apparatus is idling, that is with the motor 6 operating and the valve in nozzle 16 closed.

On opening of the valve in nozzle 16, the pressure in the lower part of cylinder 87 will drop to the normal dispensing pressure, which is usually from 15 to 17 p. s. i. Such dispensing pressure plus the pressure of spring 106 on the piston 97 will be less than the pressure of liquid in the upper part of the cylinder 87 produced by the priming pump, when discharging liquid through the restricted orifice 92. Thus, the piston 97 will be moved downwardly, carrying ball 67 out of its neutral position into a position in which the metering pump will be driven and liquid forced into and through the delivery conduit 12 and hose 15 and discharged through nozzle 16 into the fuel tank to be serviced. The quantity and/or cost of the liquid delivered will be indicated by the register 18, which is driven by the metering pump through shaft 17 in the usual manner. As soon as the desired amount of liquid has been delvered, the valve in nozzle 16 is closed and shortly thereafter, the motor 6 will be stopped and the nozzle 16 hung up on the pump housing 1 in the usual manner. On closing of the valve in nozzle 16, the pressure in the lower part of cylinder 87 will rapidly rise and become sufficient to lift piston 97 against the pressure of the liquid discharged by the priming pump and move the speed-changing element of the transmission into neutral position, thereby stopping operation of the metering pump. The priming pump, however, will continue in operation until the motor 6 is stopped. Should the valve in nozzle 16 be closed suddenly, resulting in a sudden application of a greater pressure than necessary to the piston 97, the sleeve 90 will be moved away from its seat, uncovering the large outlet 88 thereby providing momentarily a faster relief of pressure above the piston to lessen the shock from the excess pressure applied.

The invention provides a simplified and improved mechanism which has one advantageous use in apparatus, such as used in service stations, for dispensing measured quantities of motor fuel. The usual means, heretofore used for the purpose, includes an electric motor, driving a pump, forcing fluids into an air separator, from which air-free liquid is forced through a meter that drives a register and from which the air or gases with some liquid are forced to a liquid recovery chamber that returns the liquid to the pump and vents the air to the atmosphere. The mechanism of this invention eliminates the air separator and the liquid recovery chamber. The metering pump is, or may be, exactly the same as the meter heretofore used, except that its shaft is somewhat larger to carry the load of driving the pistons for the pumping action. The inlet chamber of the metering pump, which is necessary in any event, is connected through a small rotary pump to the air space of the storage tank, in which space separation of air and liquid takes place. To prevent air from entering the metering pump, the latter is driven through a variable-speed transmission which is controlled by the pressure of the fluids discharged by the priming pump so that the metering pump cannot operate except when the inlet chamber contains sufficient liquid. The transmission and its control is relatively simple. The rotary pump is much smaller (about one-tenth the capacity) than that heretofore used since it simply has to effect the initial priming and subsequently provide the small flow necessary through the transmission control means. This liquid is not forced against the high pressure of the closure spring of a valve controlling a by-pass around the pump, as has been customary heretofore after dispensing stops and before the motor stops. Here, the metering pump is stopped immediately, when the valve in the hose nozzle is closed and only the priming pump continues to pump. The priming pump operates at a very low rate and does not do any work comparable to that which is done in the usual gasoline dispenser under the same conditions, where the larger rotary pump forces liquid at the dispensing rate, say 15 gallons per minute, against the heavy pressure of the closure spring of a by-pass valve.

A most important feature of the invention is the control of the operation of the metering pump from the pressure of the fluids discharged from a small continuously-driven priming pump. While the preferred arrangement is to couple with this control, the control whereby closure of the valve in the delivery conduit also stops the metering pump, the invention can be used without the latter control, by eliminating the connection from the delivery conduit to the lower side of cylinder 87 and providing instead the usual relief-valve-controlled by-pass around the metering pump.

The metering pump, once primed, normally remains so. Liquid is fed to it by flow over the top of partition 50, which contains the ports 49 and functions as a dam. Should the suction pipe 11 drain through leakage, the liquid which has passed through ports 49 cannot flow back. Consequently, on a subsequent dispensing operation, the metering pump will be fully primed but will not be set in operation until the priming pump has evacuated all the air from conduit 11 and most of the air from the chamber 46. The arrangement insures the delivery of air-free liquid only to the cylinders of the metering pump.

The invention also provides for driving the metering pump at different speeds according to the circumstances. For example, the speed of pumping will automatically accommodate itself to the particular height of lift that exists. If the lift is too great, the pump when working at its maximum rate will not be able to completely fill the inlet chamber 46 and the priming pump discharge will then include some air or gas, thereby lowering the pressure on the control piston 97 and shifting the speed-changing element of the transmission to decrease the speed of the metering pump until a rate is reached at which the fluid pumped into chamber 46 will be all liquid. In the event of an air leak, the metering pump will be slowed down in a similar manner and it may continue to operate but at a lower rate, provided that the leak is not too large. If the leak is excessive, then operation of the metering pump will stop. In the present example, the metering pump will operate with a leak in the suction pipe until the area of the leak is equivalent to that of a hole about .06 inch in diameter.

The invention thus provides mechanism for delivering measured quantities of air-free liquid, as for example in dispensing apparatus for motor fuels, that is of simplified and improved form and performs its work efficiently and with less waste of power than the mechanisms heretofore used for the purpose.

What is claimed is:

1. The combination with a metering pump of the positively-acting displacement type having an inlet, a chamber communicating with the inlet and adapted for connection to a supply of liquid, and an outlet; a shaft for driving the metering pump, a shaft driven by the metering pump and adapted for connection to registering mechanism, a priming pump having an inlet connected to said chamber and an outlet, a discharge conduit connected to the last-named outlet, driving means for the priming pump and the metering pump, the driving means for the metering pump including a variable-speed transmission to said driving shaft, and control means for said transmission interposed in said discharge conduit and actuated by pressure of the liquid discharged by said priming pump to vary the speed of said driving shaft proportionately with such pressure.

2. The combination, as claimed in claim 1, in which said control means includes a shiftable speed-varying member biased to zero-speed position and actuated against its bias by pressure of the liquid discharged by the priming pump to increase the speed of the first-named shaft as such pressure increases.

3. The combination, as claimed in claim 1, in which said discharge conduit includes an orifice of restricted area capable of passing air or gases at as great a rate as that at which they are discharged by the priming pump but incapable of passing liquid at such rate, and said control means includes a speed-varying member biased to zero-speed position, while the priming pump is discharging air or gases, and actuated against its bias by the back pressure developed when liquid is forced through said orifice.

4. The combination, as claimed in claim 1, in which the control means includes a cylinder interposed in said discharge conduit to receive liquid discharged by the priming pump, a piston in said cylinder, and a speed-varying member connected to the piston to be moved thereby to vary the speed of said driving shaft.

5. The combination with a metering pump of the positively-acting displacement type having an inlet, a chamber communicating with the inlet, and an outlet; a first and relatively-large suction conduit for connecting said inlet chamber to a source of supply of liquid, a priming pump, a second and relatively-small suction conduit connecting said inlet chamber to the inlet of the priming pump, a second chamber, a movable wall therein, a conduit connecting the outlet of the priming pump to the second chamber on one side of said movable wall, said second chamber having on the same side of said wall a restricted outlet that freely passes air and gases discharged by the priming pump but restricts the flow of liquid and produces pressure to move said wall in one direction, yieldable means for moving said wall in the other direction, means for driving both pumps, the driving means for the metering pump including a speed-changing device actuated by movement of said wall from a zero-speed position, when the priming pump discharges air or gases into the second chamber, to a maximum speed position, when the priming pump is discharging liquid at its maximum rate.

6. The combination as claimed in claim 5, in which the outlet of the metering pump is connected to a dispensing conduit having a valve for opening and closing the same, and a conduit connects the dispensing conduit to the second chamber on the other side of said wall, the force due to said yieldable means plus the pressure in the dispensing conduit, when its valve is open and closed, being respectively less and greater than the force due to the pressure of liquid discharged by the priming pump.

7. The combination as claimed in claim 5, in which the outlet of the metering pump is connected to a dispensing conduit having a check valve enabling outflow, and a valve for opening and closing the conduit, and a conduit connects the dispensing conduit, at a location between the check valve and delivery valve, to the second chamber on the other side of said wall, the force due to said yieldable means plus the pressure in the dispensing conduit, when its valve is open and closed, being respectively less and greater than the force due to the pressure of liquid discharged by the priming pump.

8. The combination with a metering pump of the positively-acting displacement type having an inlet, a chamber communicating with the inlet and adapted for connection to a source of supply of liquid, and an outlet; a shaft for driving the metering pump, a shaft driven by the metering pump and adapted for connection to registering mechanism, a priming pump having an inlet connected to said chamber and an outlet, driving means for the priming pump and the metering pump, the driving means for the metering pump including a variable-speed transmission to said driving shaft, a second chamber connected to the priming pump outlet and having an outlet orifice of restricted area capable of passing air or gases at as great a rate as that at which they are pumped but incapable of passing liquid at such rate, a movable wall in said chamber, a speed-varying member connected to be moved by said wall, yieldable means for moving said wall in one direction to move said member into zero-speed position, said member being movable in the opposite direction by the pressure of liquid discharged by the priming pump, whereby the metering pump is driven only when supplied with liquid from the first-named chamber.

9. The combination, as claimed in claim 8, in which the outlet of the metering pump is connected to a delivery conduit having a valve to open and close the same, and a conduit connects the delivery conduit to the second chamber on the side opposite to that to which the outlet of the priming pump is connected, the priming pump producing pressure of the liquid on said wall in excess of the combined pressure produced by said yieldable means, and the liquid from the delivery conduit, when the valve in the latter is open, closing of said valve increasing the pressure in the delivery conduit sufficiently to move said wall against the pressure produced by the priming pump and move said member to stop the metering pump.

10. The combination, as claimed in claim 8, in which the outlet of the metering pump is connected to a delivery conduit having a valve to open and close the same, and a conduit connects the delivery conduit to the second chamber on the side opposite to that to which the outlet of the priming pump is connected, the priming pump producing liquid pressure on said wall in excess of the combined pressure produced by said yieldable means and the liquid from the delivery conduit, when the valve in the latter is open, closing of said valve increasing the pressure in the delivery conduit sufficiently to move said wall against the pressure produced by the priming pump and move said member to stop the metering pump, and a relief valve connected to the second chamber opening to relieve excess pressure caused by a sudden closing of said valve.

11. The combination with a metering pump of the positively-acting displacement type, having a distributing valve with an interior inlet and an exterior outlet, a shaft for driving the metering pump and said valve, and a shaft driven by said metering pump and adapted for driving connection with registering mechanism, a casing superposed on the metering pump and enclosing said valve, said casing being partitioned into an outlet chamber encompassing said valve and the outlet thereof and an inlet chamber in part overlying said valve and communicating with the inlet thereof, a first and relatively-large suction conduit for connecting said inlet chamber to a source of liquid supply, a priming pump, a second and relatively small suction conduit connecting said inlet chamber to said priming pump, a cylinder, a piston therein, a conduit connecting the outlet of the priming pump to said cylinder on one side of said piston, said cylinder having on said side of the piston a restricted outlet that freely passes air and gasses discharged by the priming pump but restricts the rate of flow of liquid and produces pressure on said piston for moving it in one direction, yieldable means for moving the piston in the opposite direction, means for driving said pumps, the driving means for the metering pump including a speed-changing device actuated by movement of said piston from a zero-speed position, when the priming pump is discharging air and gases into said cylinder, to a maximum speed position, when the priming pump is discharging liquid at its maximum rate.

12. The combination, as claimed in claim 11, in which the outlet of the metering pump is connected to a dispensing conduit having a valve, and a conduit connects the dispensing conduit to said cylinder on the opposite side of said piston, the combined pressure on said piston of said yieldable means and the liquid from the dispensing conduit, when the valve in the dispensing conduit is open and closed, being respectively less and greater than the opposing pressure on the piston from liquid discharged by the priming pump.

13. The combination with a metering pump of the positively-acting displacement type, including a casing having an inlet, a chamber communicating with the inlet and adapted for connection to a source of supply of liquid, and an outlet; a second casing secured to one side of the first casing, a shaft for driving the metering pump having a portion extending into the second casing, a priming pump mounted in the second casing and having its inlet connected to said chamber, a drive shaft for the priming pump, a variable-speed transmission in said second casing for driving the first shaft from the second shaft at speeds varying from zero to a maximum, and control means for said transmission operable when the priming pump discharges air or gases to maintain the transmission in zero-speed position and operable when the priming pump is discharging liquid to drive the shaft of the metering pump at speeds varying with the pressure of the liquid discharged.

14. The combination with a metering pump of the positively-acting displacement type, including a casing having an inlet, a chamber communicating with the inlet and adapted for connection to a source of supply of liquid, and an outlet; a second casing secured to one side of the first casing, a shaft for driving the metering pump having a portion extending into the second casing, a disk fixed to said portion of said shaft within the second casing, a priming pump mounted in the second casing and having its inlet connected to said chamber, a driving shaft for the priming pump having its inner end extending into the second casing with its axis at right angles to the axis of said disk, a ball located between the inner end of the priming-pump-driving shaft and the periphery of said disk, a spring for thrusting the last-named shaft axially against the ball and the latter against the periphery of said disk, and means for moving said ball from a neutral position, wherein its center lies in the axis of the last-named shaft, radially outward to other positions and back again controlled by the pressure of the fluids discharged by the priming pump.

15. The combination, as claimed in claim 14, in which the ball-moving means comprises a cage for retaining the ball and slidable in a direction parallel to the axis of said disk in the space between the inner end of the priming pump shaft and the periphery of said disk, a second chamber having a movable wall connected to move said cage, said second chamber having an inlet connected to the outlet of the priming pump and a restricted outlet for freely passing air or gases but restricting the rate of flow of liquid to create pressure on said movable wall to move the ball from zero speed to said other positions.

16. The combination, as claimed in claim 14, in which the ball-moving means comprises a cylinder having its axis disposed parallel to the axis of said disk and having near one end an inlet connected to the outlet of the priming pump and a restricted outlet for freely passing air or gases but restricting the flow of liquid, a piston slidable in said cylinder, a rod fixed to the piston, and a cage for said ball fixed to the upper end of said rod and reciprocable in the space between the inner end of the priming pump shaft and the periphery of said disk, and yieldable means acting on the piston in opposition to the pressure of liquid discharged by the priming pump.

17. The combination, as claimed in claim 14, in which the ball-moving means comprises a cylinder having its axis disposed parallel to the axis of said disk and having near one end an inlet connected to the outlet of the priming pump and a restricted outlet for freely passing air or gases but restricting the flow of liquid, a piston slidable in said cylinder, a rod fixed to the piston, and a cage for said ball fixed to the upper end of said rod and reciprocable in the space between the inner end of the priming-pump shaft and the periphery of said disk, and stops for limiting the movement of the ball-carrying cage and arresting it in said neutral position and in its maximum speed position.

18. Liquid dispensing apparatus, comprising, a metering pump of the positively-acting displacement type having an inlet and an outlet, a suction pipe connected at one end to said inlet and adapted for connection at the other end to a supply tank of liquid, a dispensing conduit connected at one end to said outlet, a valve in said conduit near its other end, a positively-acting priming pump, a motor for driving the second pump, a conduit smaller than said suction pipe connecting said inlet to the inlet of the priming pump, a return conduit connected at one end to the outlet of the priming pump and adapted for connection at its other end to said tank, and means for driving the metering pump from said motor at speeds varying in direct proportion to the pressure of liquid discharged by the priming pump.

19. The combination, as claimed in claim 18, in which the driving means for the metering pump includes a speed-changing member shiftable from a first position in which the metering pump is stopped to other positions in which the metering pump is driven at various speeds, and means for shifting said member from said first position to said other positions controlled by the pressure of liquid discharged by the priming pump.

20. The combination, as claimed in claim 18, in which the driving means for the metering pump includes a speed-changing member shiftable from a first position in which the metering pump is stopped to other positions in which the metering pump is driven at various speeds, means for shifting said member from said first position to said other positions controlled by the pressure of liquid discharged by the priming pump, and means operable on closure of the valve in the dispensing conduit for shifting said member into its first position.

References Cited in the file of this patent

UNITED STATES PATENTS

| | | |
|---|---|---|
| 2,416,361 | Trexler | Feb. 25, 1947 |
| 2,427,551 | De Lancey | Sept. 16, 1947 |
| 2,427,552 | De Lancey | Sept. 16, 1947 |